US 9,424,063 B2

United States Patent
Kirubanandam et al.

(10) Patent No.: US 9,424,063 B2
(45) Date of Patent: Aug. 23, 2016

(54) METHOD AND SYSTEM FOR GENERATING REMEDIATION OPTIONS WITHIN A CLUSTER OF HOST COMPUTERS THAT RUN VIRTUAL MACHINES

(71) Applicant: VMware, Inc., Palo Alto, CA (US)

(72) Inventors: Jeevitha Kirubanandam, Sunnyvale, CA (US); Ganesha Shanmuganathan, Mountain View, CA (US); Keith Farkas, San Carlos, CA (US); Duncan Epping, Helmond (NL); Aashish Parikh, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 172 days.

(21) Appl. No.: 14/264,700

(22) Filed: Apr. 29, 2014

(65) Prior Publication Data
US 2015/0309826 A1    Oct. 29, 2015

(51) Int. Cl.
*G06F 11/00* (2006.01)
*G06F 9/455* (2006.01)
*G06F 11/07* (2006.01)

(52) U.S. Cl.
CPC .......... *G06F 9/45558* (2013.01); *G06F 11/07* (2013.01); *G06F 11/079* (2013.01); *G06F 11/0793* (2013.01); *G06F 2009/45591* (2013.01); *G06F 2009/45595* (2013.01)

(58) Field of Classification Search
CPC .......... G06F 9/45533; G06F 9/45558; G06F 11/079; G06F 11/0793
See application file for complete search history.

(56) References Cited

U.S. PATENT DOCUMENTS

| | | | |
|---|---|---|---|
| 2006/0161819 A1* | 7/2006 | Nissan-Messing . | G06F 11/0793 714/48 |
| 2008/0126829 A1 | 5/2008 | Robertson et al. | |
| 2008/0189468 A1 | 8/2008 | Schmidt et al. | |
| 2009/0300430 A1* | 12/2009 | Nissan-Messing . | G06F 11/0793 714/48 |
| 2012/0297236 A1 | 11/2012 | Ziskind et al. | |
| 2013/0339800 A1 | 12/2013 | Lange | |
| 2014/0059379 A1 | 2/2014 | Ren et al. | |
| 2014/0075029 A1 | 3/2014 | Lipchuk et al. | |
| 2014/0372790 A1 | 12/2014 | Antony | |
| 2015/0309825 A1* | 10/2015 | Farkas ................ | G06F 9/45558 718/1 |

OTHER PUBLICATIONS

Abawajy, J.H; "Fault-Tolerant Scheduling Policy for Grid Computing Systems"; 7 pgs.; 2004.

* cited by examiner

*Primary Examiner* — Charles Ehne

(57) ABSTRACT

A method for adjusting the configuration of host computers in a cluster on which virtual machines are running in response to a failed change in state is disclosed. The method involves receiving at least one reason a change in state failed the present check or the future check, associating the at least one reason with at least one remediation action, wherein the remediation action would allow the change in state to pass both a present check and a future check, assigning the at least one remediation action a cost, and determining a set of remediation actions to perform based on the cost assigned to each remediation action. In an embodiment, the steps of this method may be implemented in a non-transitory computer-readable storage medium having instructions that, when executed in a computing device, causes the computing device to carry out the steps.

18 Claims, 8 Drawing Sheets

METHOD AND SYSTEM FOR GENERATING REMEDIATION OPTIONS WITHIN A CLUSTER OF HOST COMPUTERS THAT RUN VIRTUAL MACHINES

BACKGROUND

A complex virtual machine system may include several clusters of individual host computers (hosts) with each host supporting hundreds of virtual machines (VMs). The virtual machine network can undergo many user-initiated or automatic changes such as, for example, adding or removing VMs and hosts to the network during routine operation and maintenance or hosts failing during normal operation. However, network managers want to be assured that such changes will not disrupt pre-established performance guarantees. Performance guarantees can be difficult to achieve after the changes unless properties of the VMs can be controlled or predicted after the changes are made.

Control or predictability of VM properties is typically ensured by reserving a fixed amount of resources for each VM in a cluster within the virtual machine network. However, reserving resources for each VM can be tedious and, if not continuously managed, ineffective. Furthermore, resource reservations that cannot be violated greatly hinder the ability of a cluster to react to changes in the network. For example, if a host fails, some VMs may not be able to restart if insufficient resources are available to satisfy resource reservations despite the availability of sufficient resources to support the VMs. Thus, there is a need for a way to guarantee VM performance while allowing various user-initiated changes to be implemented.

SUMMARY

A method for adjusting the configuration of host computers in a cluster on which virtual machines are running in response to a failed change in state is disclosed. The method involves receiving at least one reason a change in state failed the present check or the future check, associating the at least one reason with at least one remediation action, wherein the remediation action would allow the change in state to pass both a present check and a future check, assigning the at least one remediation action a cost, and determining a set of remediation actions to perform based on the cost assigned to each remediation action. In an embodiment, the steps of this method may be implemented in a non-transitory computer-readable storage medium having instructions that, when executed in a computing device, causes the computing device to carry out the steps.

In another embodiment, a computer system for supporting a change in state within a cluster of host computers is disclosed. The computer system includes at least one host computing device, the host computing device including a processor and memory for running instantiated virtual machines, and a virtual machine management system configured to adjust the configuration of host computing devices in response to a failed present check or future check. The at least one host computing device and the virtual machine management system are configured to receive at least one reason a change in state failed the present check or future check, associate the at least one reason with at least one remediation action, wherein the remediation action would allow the change in state to pass both a present check and a future check, assign the at least one remediation action a cost, and determine a set of remediation actions to perform based on the cost assigned to each remediation action.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
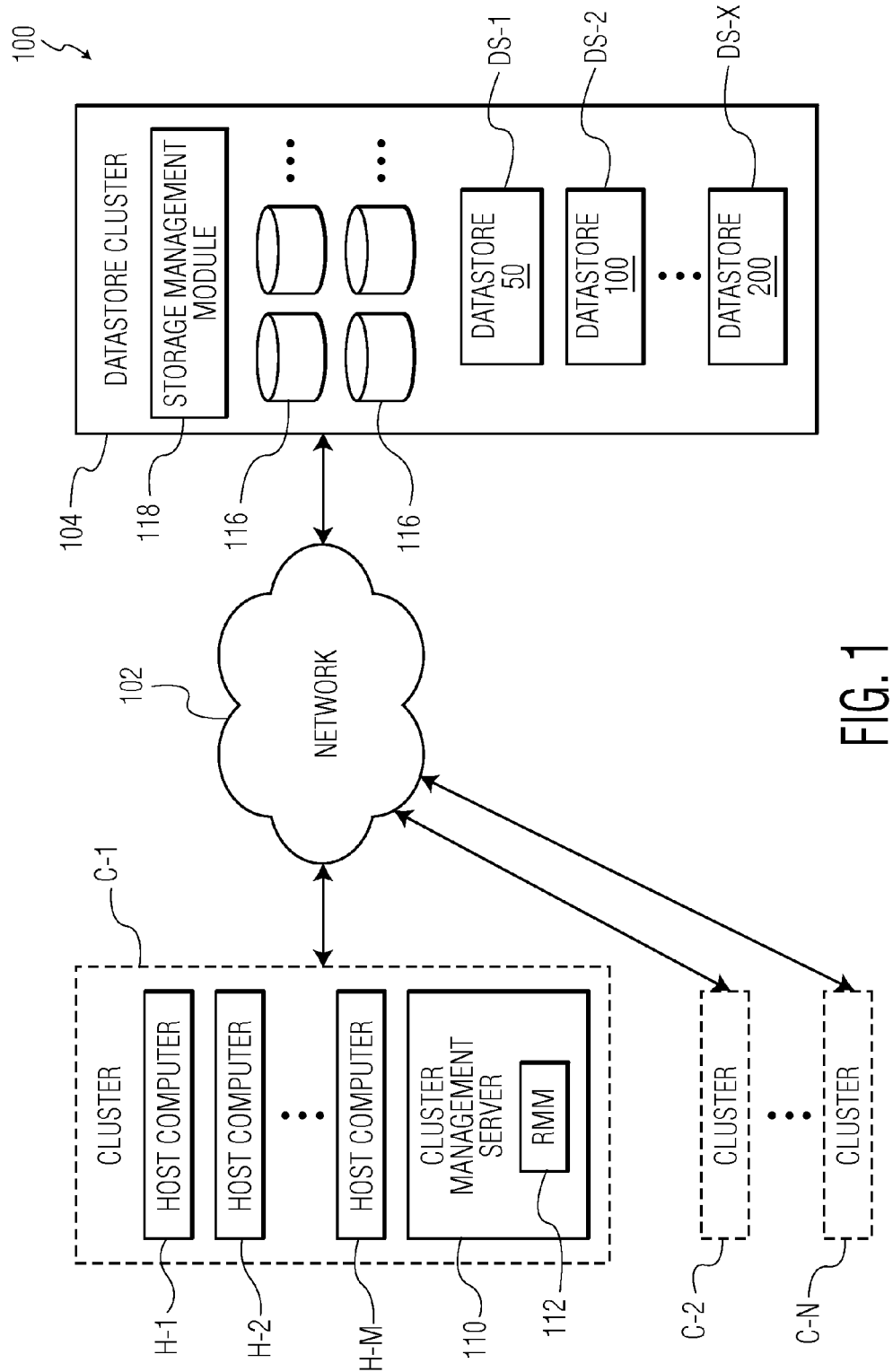
FIG. 1 is a block diagram of a virtual machine network.

Turning now to FIG. 1, a block diagram of a virtual machine network is shown. The virtual machine network includes a network 102, clusters C-1, C-2 . . . C-N (where N is a positive integer) of host computers, and a datastore cluster 104. The exact number of host computer clusters included in the distributed computer system can be, for example, from a few clusters to tens of clusters or more. The host computers of the different clusters and the datastore cluster are connected to the network. Thus, each of the host computers in the clusters is able to access the datastore cluster via the network and may share the resources provided by the datastore cluster with the other host computers. Consequently, any process running on any of the host computers may also access the datastore cluster via the network.

In the illustrated embodiment, each of the clusters C-1, C-2 . . . C-N includes a number of host computers H-1, H-2 . . . H-M (where M is a positive integer) and a cluster management server 110. The number of host computers included in each of the clusters can be any number from, for example, one to several hundred or more. In addition, the number of host computers included in each of the clusters can vary so that different clusters can have a different number of host computers. While at least some of the host computers may be virtualized, in the embodiment of FIG. 1, the host computers are physical computer systems that host or support one or more VMs so that the VMs are executing on the physical computer systems. The host computers may be servers that are commonly found in data centers. As an example, the host computers may be servers installed in one or more server racks. Typically, the host computers of a cluster are located within the same server rack.

Each of the cluster management servers 110 in the clusters C-1, C-2 . . . C-N operates to monitor and manage the host computers H-1, H-2 . . . H-M in the respective cluster. Each cluster management server may be configured to monitor the current configurations of the host computers and the VMs running on the host computers, for example, virtual machines (VMs), in the respective cluster. The monitored configurations may include the hardware configuration of each of the host computers, such as CPU type and memory size, and/or software configurations of each of the host computers, such as operating system (OS) type and installed applications or software programs. The monitored configurations may also include VM hosting information, i.e., which VMs are hosted and running on which host computers. The monitored configurations may also include VM information. The VM information may include the size of each of the VMs, virtualized hardware configurations for each of the VMs, such as virtual CPU type and virtual memory size, software configurations for each of the VMs, such as OS type and installed applications or software programs running on each of the VMs, and virtual storage size for each of the VMs. The VM information may also include resource parameter settings, such as demand, limit, reservation and share values for various resources, e.g., CPU, memory, network bandwidth and storage, which are consumed by the VMs. The demands of the VMs for the consumable resources are determined by the host computers hosting the VMs by monitoring the current usage of resources by the VMs, e.g., CPU processing usage, memory usage, network usage and/or storage usage, and provided to the respective cluster management server.

In some embodiments, the cluster management servers 110 may be implemented on separate physical computers. In other embodiments, the cluster management servers may be implemented as software programs running on the host computer 200 shown in FIG. 2, or virtual computers, such as VM 220-1, 220-2 . . . 220-L. In an implementation, the cluster management servers are VMware vCenter™ servers with at least some of the features available for such servers and each resource management module 112 is a VMware Distributed Resource Scheduler™, which provides a Distributed Resource Scheduler (DRS) service as is known in the field.

The network 102 can be any type of computer network or a combination of networks that allows communications between devices connected to the network. The network 102 may include the Internet, a wide area network (WAN), a local area network (LAN), a storage area network (SAN), a fibre channel network and/or other networks. The network 102 may be configured to support protocols suited for communications with storage arrays, such as Fibre Channel, Internet Small Computer System Interface (iSCSI), Fibre Channel over Ethernet (FCoE) and HyperSCSI.

The datastore cluster 104 is used to store data for the host computers of the clusters C-1, C-2 . . . C-N, which can be accessed like any other type of storage device commonly connected to computer systems. In an embodiment, the datastore cluster can be accessed by entities, such as VMs running on the host computers, using any file system, e.g., virtual machine file system (VMFS) or network file system (NFS). The datastore cluster includes one or more computer data storage devices 116, which can be any type of storage devices, such as solid-state devices (SSDs), hard disks or a combination of the two. At least some of these storage devices may be local storage devices of the host computers, e.g., locally attached disks or SSDs within the host computers. The storage devices may operate as components of a network-attached storage (NAS) and/or a storage area network (SAN). The datastore cluster includes a storage management module 118, which manages the operation of the datastore cluster. In an embodiment, the storage management module is a computer program executing on one or more computer systems (not shown) of the datastore cluster. The datastore cluster supports multiple datastores DS-1, DS-2 . . . DS-X (where X is a positive integer), which may be identified using logical unit numbers (LUNs). In an embodiment, the datastores are virtualized representations of storage facilities. Thus, each datastore may use resources from more than one storage device included in the datastore cluster. The datastores are used to store data associated with the VMs supported by the host computers of the clusters C-1, C-2 . . . C-N. For virtual machines, the datastores may be used as virtual storage or virtual disks to store files needed by the virtual machines for operation. One or more datastores may be associated with one or more clusters. In an embodiment, the same datastore may be associated with more than one cluster.

Figure 2:
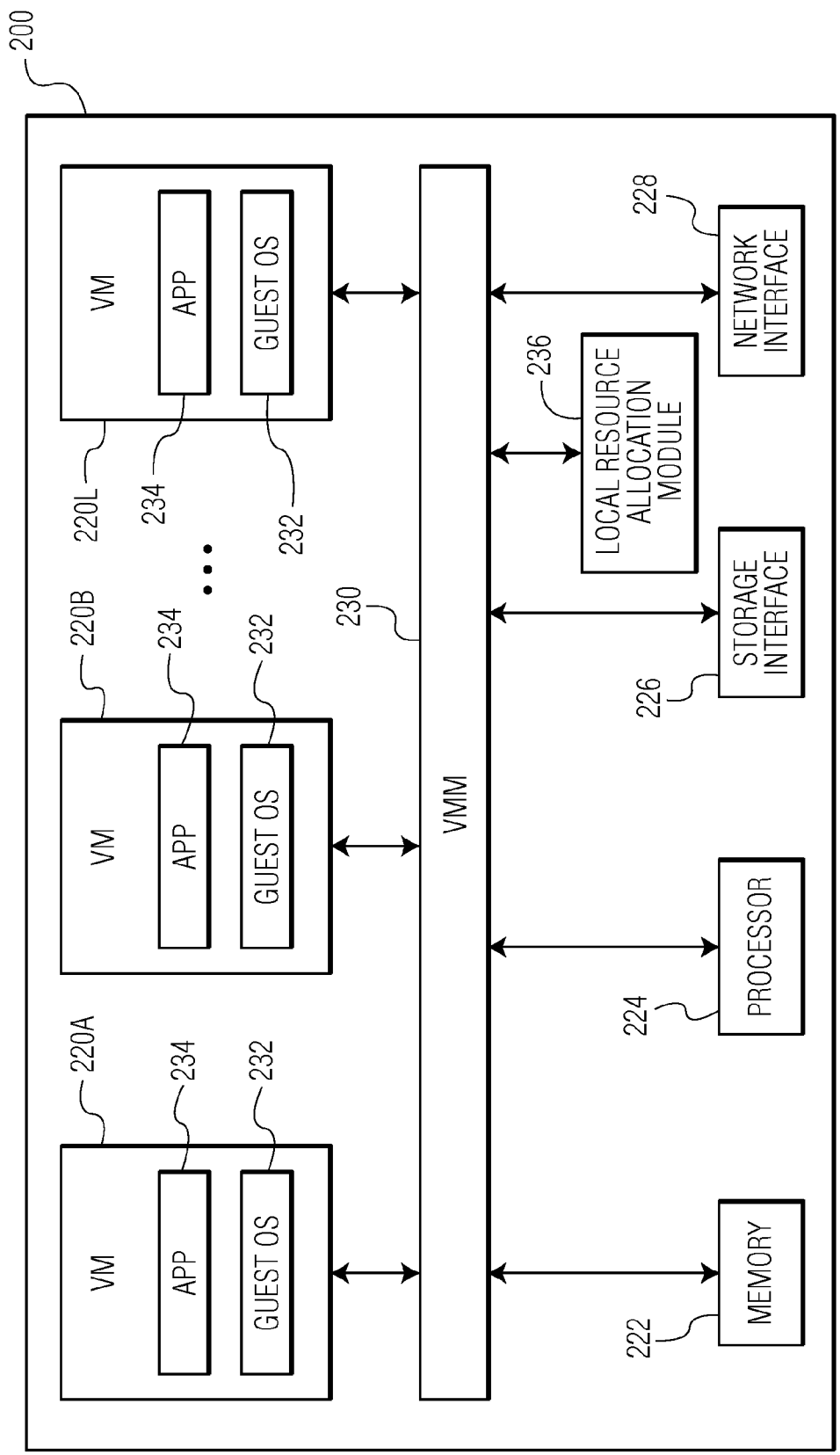
FIG. 2 is a block diagram of host computer from the virtual machine network of FIG. 1.

Turning now to FIG. 2, components of a host computer 200 which is representative of the host computers H-1, H-2 ... H-M, are shown. In FIG. 2, the physical connections between the various components of the host computer are not illustrated. In the illustrated embodiment, the host computer is configured to support a number of VMs 220-1, 220-2 ... 220-L (where L is a positive integer). The number of VMs supported by the host computer can be anywhere from one to more than one hundred. The exact number of VMs supported by the host computer is limited by the physical resources of the host computer or other constraints such as licensing. The VMs share at least some of the hardware resources of the host computer, which includes system memory 222, one or more processors 224, a storage interface 226, and a network interface 228. The system memory 222, which may be random access memory (RAM), is the primary memory of the host computer. The processor 224 can be any type of processor, such as a central processing unit (CPU) commonly found in a server. The storage interface 226 is an interface that allows the host computer to communicate with the datastore cluster 104 in FIG. 1. As an example, the storage interface may be a host bus adapter or a network file system interface. The network interface 228 is an interface that allows the host computer to communicate with other devices in the cluster as well as devices connected to the network 102 in FIG. 1. As an example, the network interface may be a network adapter.

In the illustrated embodiment, the VMs 220A, 220B ... 220L run on top of a virtual machine monitor 230, which is a software interface layer that enables sharing of the hardware resources of the host computer 200 by the VMs. However, in other embodiments, one or more of the VMs can be nested, i.e., a VM running in another VM. For example, one of the VMs may be running in a VM, which is also running in another VM. The virtual machine monitor may run on top of the host computer's operating system or directly on hardware of the host computer. In some embodiments, the virtual machine monitor runs on top of a hypervisor that is installed on top of the hardware components of the host computer. With the support of the virtual machine monitor, the VMs provide virtualized computer systems that give the appearance of being distinct from the host computer and from each other. Each VM may include a guest operating system 232 and one or more guest applications 234. The guest operating system is a master control program of the respective VM and, among other things, the guest operating system forms a software platform on top of which the guest applications run. Guest applications are individual programs such as, for example, an email manager or a system logger.

Similar to any other computer system connected to the network 102 in FIG. 1, the VMs 220A, 220B ... 220L shown in FIG. 2 are able to communicate with other computer systems connected to the network using the network interface 228 of the host computer 200. In addition, the VMs are able to access the datastore cluster 104 in FIG. 1 using the storage interface 226 of FIG. 2 of the host computer.

The host computer 200 also includes a local resource allocation module 236 that operates as part of a resource management system, such as a distributed resource scheduler system, to manage resources consumed by the VMs 220A, 220B ... 220L. The local resource allocation module in each host computer cooperatively operates with the local resource allocation modules in the other host computers of the network computer system 100 to generate resource allocation settings and perform resource scheduling, which includes balancing the loads of software processes and/or storage resource scheduling, among the host computers H-1, H-2 ... H-M of the host computer clusters C-1, C-2 ... C-N. Although the local resource allocation module is illustrated in FIG. 2 as being separate from the virtual machine monitor 230, the local resource allocation module may be implemented as part of the virtual machine monitor. In some embodiments, the local resource allocation module is implemented as software programs running on the host computer. However, in other embodiments, the local resource allocation module may be implemented using any combination of software and hardware.

During operation, virtual machine networks are often quite dynamic, with elements, such as clusters, hosts, VMs, and datastores, being added and removed on the fly. Adding and removing elements from the virtual machine network will impact the consumption of shared resources. For example, adding a new host that shares a datastore resource pool with currently existing hosts can reduce the performance of the currently existing hosts if the newly added host consumes a significantly large amount of storage resources from the datastore resource pool.

In accordance with an embodiment of the invention, when a change in state within a cluster of host computers that run virtual machines is identified (e.g., contemplated or attempted by a user or occurs on its own), a determination is made as to whether historical demand of at least one virtual machine in the cluster can be met by resources available in the cluster of host computers (e.g., referred to as a "present check") and a determination is made as to whether predefined criteria for available resources within the cluster of host computers can still be maintained after at least one different predefined change in state (e.g., referred to as a "future check"). To perform the present check and the future check, a change in state and a change in state after a predefined change in state are simulated and evaluated. A predefined change in state can include, for example, a user-initiated change (e.g., adding a VM, removing a VM, adding a host, removing a host) and a non-user-initiated change (e.g. a VM failure, a host failure, or an increase in resource demand.) In an embodiment, the failure of a host or VM can either be a total failure or a partial failure (e.g., one of several hard disks has failed).

In an embodiment, when a change in state is identified (e.g., a user contemplates and/or attempts to add a new VM to a cluster or to place a host in maintenance mode), an admission control process simulates the cluster after the change in state and compares historical demand of at least one VM with resources available in the simulated cluster (present check). The admission control process also simulates the cluster after the change in state and a different predefined change in state (future check) and determines, from the simulations, if the change in state will pass the present check and the future check. In an embodiment, the different predefined change of state is a failure of a certain number of hosts. If the present check fails because, for example, historical demand cannot be satisfied by the resources presently available in the cluster or if the future check fails because, for example, resources will be overutilized by predicted future demand, the change in state will not be permitted or will be permitted only after a user override. Additionally, recommendations for improving the configuration of a virtual machine network may be offered to a user so that the identified change in state can be performed. In an embodiment, the present check and future check can be periodically performed to determine that performance guarantees can still be satisfied. By performing a present check and future check when a change in state is identified, the effects of the change in state on the performance of elements in the virtual machine network are determined on a case-by-case basis in advance of implementing the change in state (e.g., if the user initiates the change in state) or when the change in state occurs (e.g., if a non-user-initiated change in state occurs) without having to define or re-define criteria of available resources for every element in the virtual machine network.

As discussed above, an identified change in the state of a virtual machine network may be user-initiated or non-user-initiated and may involve a change to a variety of different aspects of a virtual machine network. In an embodiment, a user-initiated change in state is a change in state contemplated or attempted by a user and a non-user-initiated change in state is a change in state that is not initiated by a user of the virtual machine network. Examples of a non-user-initiated change of state include a VM crash or failure, a host failure, a hardware component failure (e.g., loss of a hard drive), and a change in demand.

Figure 3:
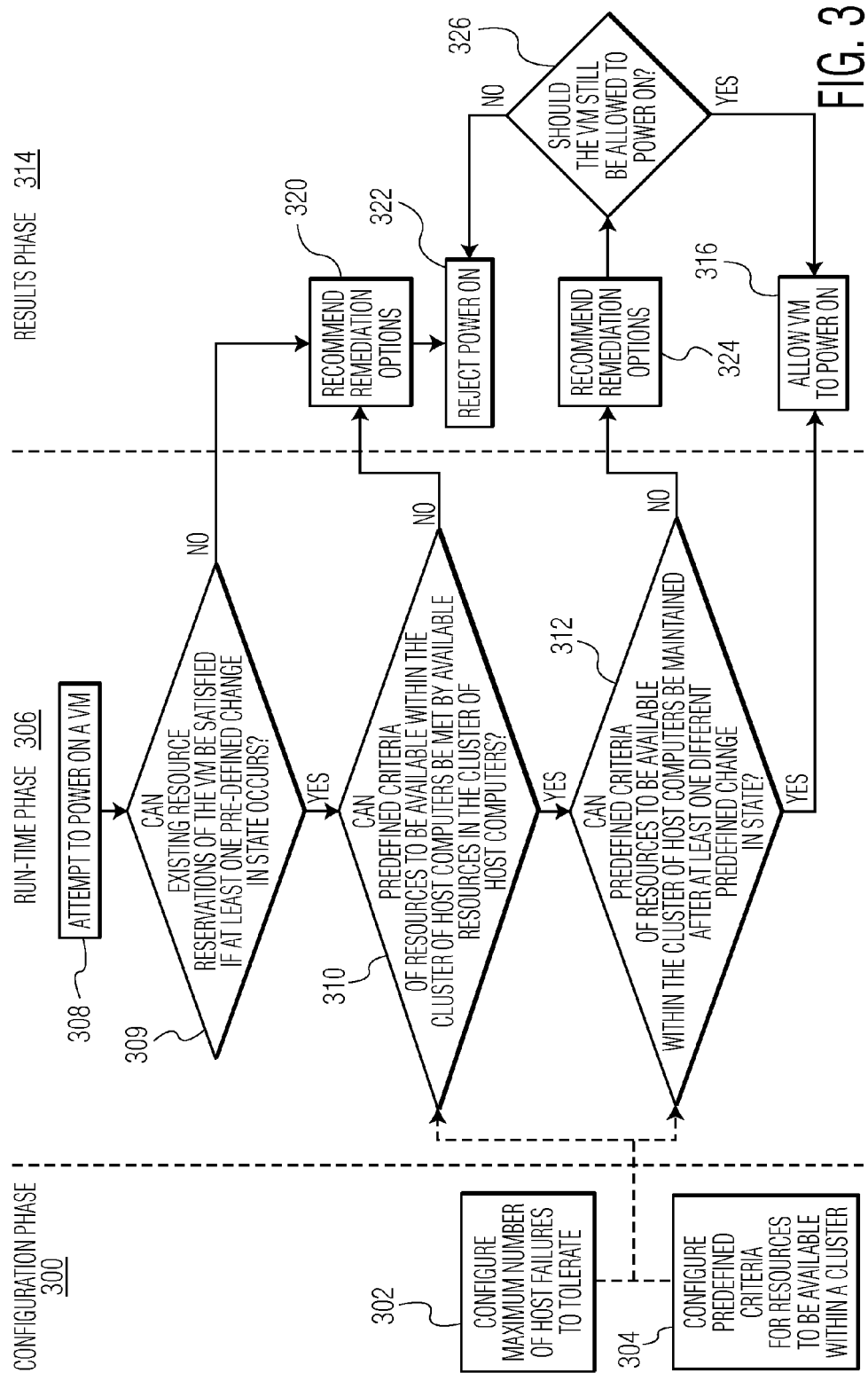
FIG. 3 is a process flow diagram of an admission control process in the case when a user attempts to power on a VM in accordance with an embodiment of the invention.

FIG. 3 is a process flow diagram of an embodiment of an admission control process in the case of a user-initiated change in state that involves an attempt to power on a VM. The admission control process involves three phases: a configuration phase 300, a run-time phase 306, and a results phase 314. In the configuration phase, at block 302, a maximum number of simulated host failures (partial or full) that can be tolerated is configured. In an embodiment, the maximum number is a user-specified number. For example, in a cluster of 32 hosts, the maximum number of simultaneous host failures can be configured to 1 host failure. In an embodiment, if the configuration of the maximum number of host failures is set for a maximum of 1 host failure, then the admission control process will be limited to calculations where, at most, only 1 host has failed. In another example, the number of host failure to tolerate can be expressed in terms of a fraction of the total resources available in a cluster (e.g., 10% of the memory available to the VMs). Then, in an embodiment, the admission control process will be limited to calculations where, at most, a number of hosts fail such that no more than 10% of the memory available to VMs in a cluster is lost. Additionally, at block 304, criteria for determining resources to be available within a cluster are defined. The criteria includes, for example, expected VM resource reservations, expected VM resource allocations, resource entitlements, expected per-host resource headroom, and expected VM "CPU ready time," as well as other metrics for measuring resources used by a VM. The criteria is then used to evaluate whether a change of state would adversely impact the performance of VMs within the cluster. For example, the criteria can be used to establish the amount of resources that must be available in a resource pool. In a case where the criteria is used to establish the amount of resources that must be available in a resource pool, the criteria may be used to determine that, given a set of VMs to be run in the cluster (e.g., all the "gold class" VMs in a cluster), 1 TB of memory and 3.8 GHz of processing power should be available. Therefore, the predefined criteria for available resources will entitle the VMs to 1 TB of memory and 3.8 GHz of processing power. In a further embodiment, the predefined criteria are configured to include the minimum amount of resources that must be available in the event one or more hosts fail such that all currently running VMs will be able to restart on different hosts within the virtual machine network.

Once the maximum number of host failures to tolerate has been configured and the predefined criteria have been configured, the process is ready for the run-time phase 306. In the run-time phase, at block 308, an attempt is made to power on a new VM (i.e., a change in state). At decision point 309, a determination is made if resource reservations of the VM can be satisfied if at least one predefined change in state occurs. For example, if the VM requires 10 GHz of processing power and the predefined change in state defines a host that has 100 GHz of processing power failing, then the determination will be whether the remaining hosts in the cluster can satisfy 110 GHz of processing power. If the resource reservations of the VM cannot be satisfied, then the VM is not powered on and remediation options are recommended as discussed below. If the resource reservations of the VM can be satisfied, then, at decision point 310, a present check is performed.

Present Check

In an embodiment, the present check involves determining if predefined criteria including, for example, historical demand of the VM can be met by available resources in the cluster of host computers. In an embodiment, in order to determine if predefined criteria can be met, resources that are currently available to VMs in the virtual machine network, but are not presently being used, are placed in a resource pool. The predefined criteria of the new VM is compared to the resources in the resource pool and, if the predefined criteria can be satisfied by the resources in the resource pool, then the change in state is determined to pass the present check. For example, if the new VM has a historical demand of 1 GB of storage and the cluster has 1 TB of unused storage, then the change in state will pass the present check because there is enough storage in the resource pool to satisfy the historical demand. In an alternate embodiment, the present check involves determining if the predefined criteria configured at block 304 can be met by available resources in the cluster of host computers. By using predefined criteria, a VM can pass the present check when fewer resources than are needed to satisfy the historical demand are available in the resource pool.

Future Check

In an embodiment, if the present check passes, at decision point 312, a future check is performed. In an alternate embodiment, even if the present check fails, the future check is performed. In an embodiment, the future check involves determining if a predefined criteria of resources to be available within the cluster of host computers can be maintained after a different predefined change in state (e.g., the failure of a predefined number of host computers). For example, the determination is made by calculating a ratio of resource entitlement for each VM before and after the simulated changes in state and determining if the ratio violates the predefined criteria. In an embodiment, the predefined criteria includes a range of resource availability (an acceptance percentage) that can be defined by a user and the ratio of entitlement is calculated by comparing the entitlement of a VM running in the virtual machine network to the entitlement of the same VM when the addition of the new VM and the predefined change in state are simulated.

In an embodiment, the future check is performed by the following steps for each VM in the virtual machine network in which the new VM would be powered on:
1) Calculate the entitlement of a VM prior to simulating the new VM being powered on;
2) Simulate powering on the VM and the predefined change in state (e.g., the failure of a predefined number of host computers);
3) Calculate the entitlement of the VM after simulating powering on the new VM (present check) and after the predefined change in state (future check) (e.g., the failure of a predefined number of host computers) based on historical data or estimates;
4) Calculate the ratio of entitlement; and
5) Compare the ratio of entitlement to the predefined criteria.

In an embodiment, the ratio of entitlement can be calculated by:

In an embodiment, the entitlement of a VM, with and without the simulated change in state (e.g., powering on a new VM) or the predefined change in state (e.g., failure of a predefined number of host computers), can be calculated based on historical demand or estimated future demand, as opposed to maximum configuration size. Historical data can be captured in multiple ways. For example, the historical data could be converted to a single number per VM (e.g., average value, 90th percentile, peak value over a period of time), the system could record demand over a period of time and then compare the recorded values, or the system could attempt to predict demand over time and record the accuracy of the predictions. Thus, rather than calculating entitlement to be equal to a maximum configuration size of a VM (e.g., the number of virtual CPUs and configured memory size in a VM template), the entitlement of a VM can be adjusted based on the demand of the VM and availability of resources in the virtual machine network (e.g., after the demands and reservations of other VMs have been satisfied and other limits and constraints have been satisfied). For example, in the case of a VM with a demand of 1 GB of memory in a cluster where 20 GB of memory is available, but currently being shared by 3 other VMs, the VM with a demand of 1 GB may be entitled to less than 1 GB of memory if, after the demands of the other 3 VMs as well as other limits and constraints are satisfied, less than 1 GB of memory remains available. If no historical or estimated future demand data is available for a VM, the demand of the VM can be estimated as the maximum possible resources the VM could consume. For example, the demand for a VM configured with a 2.8 GHz processor and 100 GB of memory will be estimated as demanding 2.8 GHz of CPU resources and 100 GB of memory resources when no historical data or estimated future demand data is available. By using entitlement, unnecessary overhead is avoided in the resource allocation process because the resource entitlement of a VM need not be continuously redefined as a cluster changes.

To calculate the entitlement for multiple resources of a VM after a change in state, the demand for each resource ("representative demand") is calculated (e.g., the demand of the VM, the demand of other VMs, the available resources on each host, and the reservations, shares, limits, and VM placement constraints are considered) independently and then combined. For example, calculating the entitlement for CPU and memory resources for a target VM after a new VM has been added involves independently calculating the representative demand for CPU resources and memory resources by the target VM based on the historical demand of CPU and memory resources by VMs in the virtual machine network. The representative demand for CPU resources and memory resources can then be combined to calculate an entitlement for the target VM with the simulated change in state.

Various mathematical techniques can be used to combine the representative demands when calculating entitlement with a change in state. In an embodiment, resources with higher demand are given more weight when calculating entitlement. In another embodiment, other mechanisms for weighting the representative demand for each resource can be used. For example, a user could specify the resources that are more critical to a VM's performance and give those resources more weight when calculating the entitlement.

In an embodiment, entitlement with a simulated change in state may be computed at a per-host level or at a cluster level by treating all hosts in a cluster as a single host. In a further embodiment, entitlement with a simulated change in state is calculated per distinct resource (e.g., CPU, system memory, etc.) and, while the calculation can be performed at a cluster level and at a host level, in some instances, the calculation performed at the host level will be more accurate because the calculation can account for resource fragmentation, constraints that prevent a VM from running on a subset of hosts (e.g., anti-affinity rules), and competition between the VMs on the same host (e.g., $2^{nd}$ level divvying).

Results Phase

Returning to FIG. 3, at decision point 312, if the ratio of entitlement after the change in state and after the predetermined change in state does not violate the predefined criteria, then the future check passes and, at block 316, in the results phase 314, the new VM is allowed to power on. However, if the present check or the future check fails, then the new VM may not be powered on in the results phase. For example, if the ratio of entitlement is calculated as 80% and the predefined criteria requires at least 75%, then the VM will be allowed to power on, but if the criteria are predefined to require at least 90% then the VM may not be allowed to power on.

Returning to decision point 310, if the present check fails, then, at block 320, remediation options will be recommended, and, at block 322, the attempt to power on the new VM may be rejected. In an embodiment, the remediation options are recommendations on how to correct problems that may occur if the VM were allowed to power on. Similarly, at decision point 312, if the future check fails because the ratio of entitlement violates the predefined criteria, then, at block 324, remediation options are recommended and, at decision point 326, a determination is made as to whether or not the VM should still be powered on. Examples of recommendations for remediation options are discussed below with reference to FIG. 5.

In an embodiment, a user can specify predefined criteria for all VMs and resources in the virtual machine network to use in the present and future checks or a user can specify criteria for each VM individually or for each resource in the cluster individually. For example, a user may require mission critical VMs to receive at least 90% of pre-failure entitlement after a host failure and a new VM is added, but may only expect test-and-development VMs to receive 10% of pre-failure entitlement or may identify unimportant VMs which can receive no entitlement (e.g., a legacy VM left in the cluster) after the new VM is added. In which case, the ratio of entitlement of mission critical VMs must be greater than 90% and the ratio of entitlement of test-and-development VMs must be greater than 10% while unimportant VMs will be evaluated, but not considered in the present and future checks. In another example, a user can determine that VMs must receive at least 80% of pre-failure memory entitlement, but only 60% of pre-failure processing entitlement.

As discussed above, the present check and the future check are facilitated by comparing the historical demand of a new VM to the resources available in the resource pool and then simulating the powering on of the new VM and a predefined change in state (e.g., the failure of a predefined number of host computers) and assessing if all VMs can be restarted. The accuracy of the simulations and assessments can be improved by considering factors that limit VM placement, which are typically ignored. For example, failure of the largest host in a cluster is typically assumed to cause the greatest impact to VMs in the virtual machine network. However, such an assumption is not necessarily valid. For example, a VM that can only be placed on two hosts in the virtual machine network will be more greatly impacted by the failure of the two hosts than by the failure of the largest host in the cluster if the VM could not be placed on the largest host.

Typically, simulated host failures can be divided into two types: "specific host failure" and "any-host failure." A specific host failure type simulation is useful when a user wants assurances that VMs will perform well after a specific host or specific hosts are unavailable (e.g., fail or are put into maintenance mode). An any-host failure type simulation is useful when a user wants to perform a "what-if" simulation and determine which host or hosts will have the largest impact if unavailable and to what degree the failure of that host will impact VM performance.

In an embodiment, when running specific host failure type simulations, simulations for the specific host are performed, and the output of the simulation can be used to interpret the impact of the failure of the specific host on the performance of VMs in the virtual machine network. When running any-host failure type simulations, simulations with multiple hosts failing, either individually or simultaneously, are performed and the output is used to determine the worst case or average case performance of a virtual machine network. For any-host failure type simulations, the simulations follow a user-defined policy when determining which hosts to simulate failing. For example, when adding a new VM to a cluster, if the user defines a policy allowing for only one host failure in the configuration phase, then only one host failure would be simulated in an any-host failure type simulation. The worst case or average case performance in an any-host failure type simulation can be determined by either computing the situation (e.g., the failure of select hosts) that results in the greatest number of VMs being impacted, or by determining the situation that results in the minimum resource allocation among VMs. For example, the addition of the new VM and the failure of each host would be simulated and, for each simulation, per VM impact would be recorded along with the number of VMs that would fail to start after the host failure. The worst case performance for each VM would then be determined and the worst cases would be considered to determine if the worst cases would violate predefined criteria. The situation in which the greatest number of worst cases of VMs violates the predefined criteria is the worst case scenario.

Figure 4:
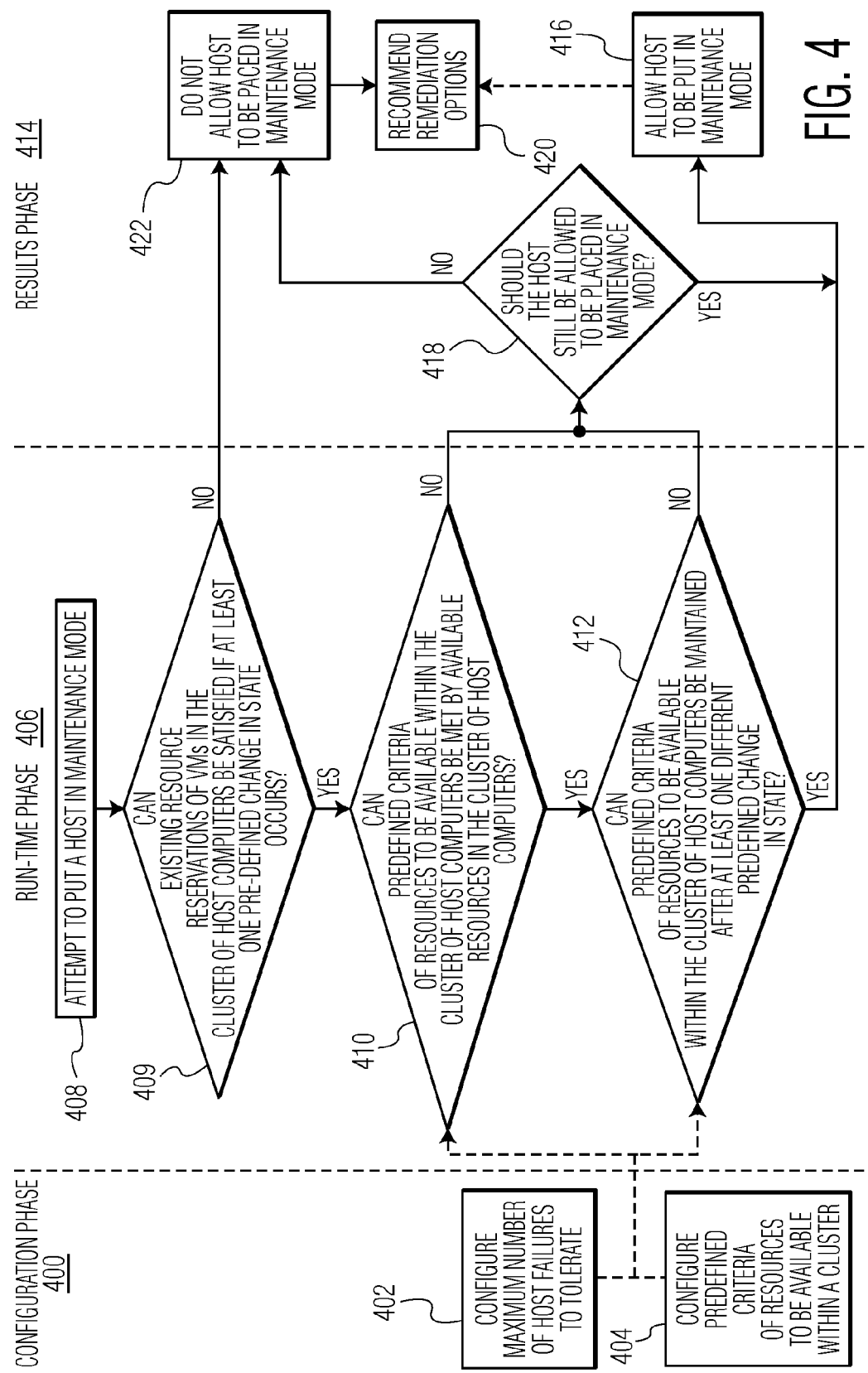
FIG. 4 is a process flow diagram of an admission control process when a user attempts to place a host in maintenance mode in accordance with an embodiment of the invention.

While the process described with reference to FIG. 3 focuses on the addition of a new VM to a cluster, a similar process can be used when attempting to remove a host from a cluster or when attempting to place a host into maintenance mode. FIG. 4 is a process flow diagram of an admission control process when a user attempts to place a host into maintenance mode. The process flow diagram depicts phases similar to those in FIG. 3, including a configuration phase 400, a run-time phase 406, and a results phase 414. In the configuration phase of FIG. 4, at block 402, the maximum number of simultaneous host failures that can be tolerated is configured and, at block 404, the predefined criteria of resources to be available within a cluster are configured. Then, at block 408 an attempt is made to place a host into maintenance mode. At decision point 409, a determination is made as to whether existing resource reservations of VMs in the cluster of host computers can be satisfied if a predefined change in state occurs. If existing resource reservations can be satisfied, at decision point 410, a present check is performed. In an embodiment, the present check involves determining if predefined criteria for virtual machines in the cluster can still be satisfied if the host is put into maintenance mode. In an embodiment, the present check involves checking if the predefined criteria for each VM can still be satisfied. In a second embodiment, the present check involves checking if the predefined criteria for a sample of VMs (e.g., 40%) can still be satisfied. If the present check passes, at decision point 412, a future check is performed. In an alternate embodiment, even if the present check fails, the future check is performed. In an embodiment, the future check involves determining if predefined criteria for available resources can be maintained if the host is put into maintenance mode and a different predefined change in state (e.g., the failure of a defined number of host computers) occurs. If it is determined that the future check passes, then, at block 416, in the results phase, the host is allowed to be placed into maintenance mode. However, if either the present check or the future check fails, then, at decision point 418, a decision is made as to whether placing the host into maintenance mode (i.e., the change in state) should be supported. For example, if a present check fails because it is determined that a VM will fail to restart because not enough resources will be available to satisfy the VM's historical demand, but the VM is determined to be unneeded, then a decision may be made to still allow the host to be placed into maintenance mode. If it is determined that the host should still be placed into maintenance mode, then, at block 416, the host is allowed to be placed into maintenance mode. Alternatively, if it is determined that the host should not be allowed to be placed into maintenance mode, then, at block 422, the host is not allowed to be placed into maintenance mode. After the host is or is not allowed to be placed into maintenance mode, at block 420, remediation options can be recommended for changes to the cluster so that the present check and future check will both pass. For example, the remediation options may recommend adjusting predefined criteria or improving homogeneity (e.g., similarity of compatibility requirements between hosts or VMs in the cluster) of the virtual machine network.

While the method discussed above concerns user-initiated operations, in an embodiment, the method could be used to perform a similar evaluation if conditions change in the cluster that could impact the performance of VMs in the virtual machine network. For example, if the demand of a percentage of the VMs increased by more than a predefined amount or if physical infrastructure, such as host or networking components, experience a complete or partial failure, then an evaluation similar to that discussed above would be performed. The purpose of this evaluation would be to warn a user if the change has caused some VMs to fail either the present or future checks. As above, if either check fails, recommendations would be generated.

As discussed above, if it is determined that the present check fails (block 310 of FIG. 3 or block 410 of FIG. 4) or that the future check fails (block 312 of FIG. 3 and block 412 of FIG. 4), then recommendations for how to pass the present check and/or future check are provided to the user. Recommendations allow for quick determination of the cause of present check and future check failures and provide guidance on reconfiguring the virtual machine network to ensure that the present and future checks will pass. In an embodiment, the recommendations are derived from the simulation output that was used to perform the present check and the future check along with additional simulation outputs. Additional simulation outputs can include, for example, simulating the virtual machine network with faster data connection speeds or under a greater workload.

Remediation Option Generation

Figure 5:
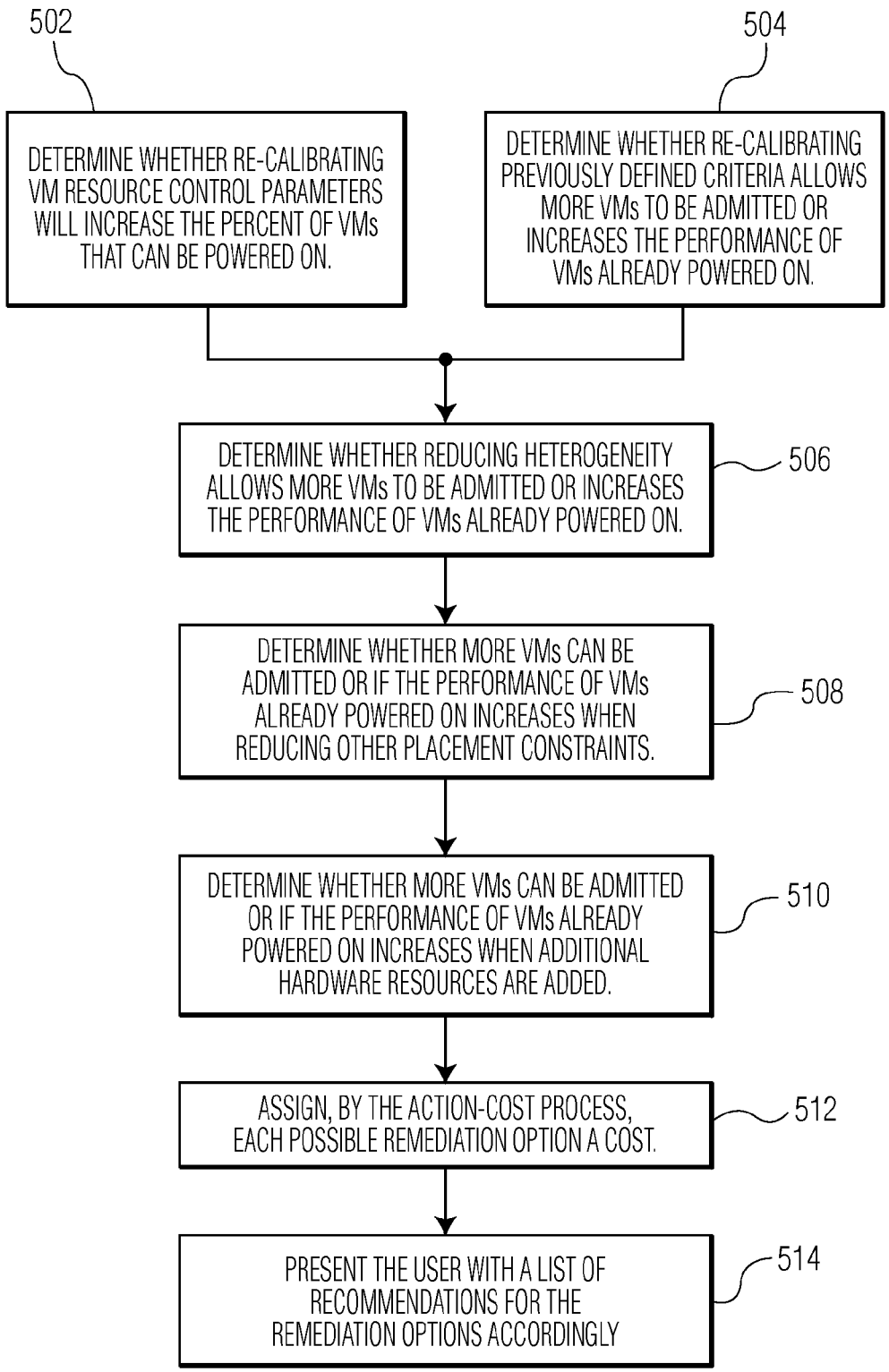
FIG. 5 is a process flow diagram for generating cost-effective remediation options in accordance with an embodiment of the invention.

FIG. 5 is a process flow diagram for generating cost-effective remediation options when, for example, a user is attempting to add a new VM to a virtual machine network and the present check or the future check fails. In an embodiment, the generation process is triggered if the present check or the future check fails. If the generation process is triggered, a number of tests are performed to determine possible remediation options and each option is assigned a cost. In the embodiment of FIG. 5, four tests are performed. At block 502, a determination is made as to whether re-calibrating VM resource control parameters that prevent VMs from powering on (e.g., reservations) will allow a greater percentage of VMs to be powered on or the number that could be restarted after a failure. In an embodiment, the determination is made by evaluating whether the resource control parameters are causing excessive resources to be allocated to certain VMs. To determine if excessive resources are being allocated to certain VMs, the present and future checks are re-performed when fewer resources are allocated to certain VMs. If an increased percentage of VMs can be powered on, then the remediation option to recalibrate VM resource control parameters will be selected as a possible remediation option. In an embodiment, the percentage of VMs able to power on must exceed a user-defined threshold before the remediation option will be selected as a possible remediation option.

At block 504, a determination is made as to whether re-calibrating predefined criteria that impact performance (e.g., shares and limits) will allow more VMs to be admitted to the cluster (i.e., pass the present and future checks). In an embodiment, the determination is made by evaluating whether the resource control parameters of a given VM are resulting in more resources than required to meet the predefined criteria being allocated to the VM. If disproportionately more (e.g., 20% or more) resources are being allocated than are needed to satisfy predefined criteria, then the future check is re-performed for a scenario in which fewer resources are being allocated to a VM. If a greater number of VMs can be admitted or if the performance of VMs already powered on increases, the remediation option to recalibrate predefined criteria to more closely match expected resource allocations will be selected as a possible remediation option. In an embodiment, the percentage of VMs that can be admitted must exceed a user-defined threshold before the remediation option will be selected as a possible remediation option.

At block 506, the degree to which host heterogeneity is limiting VM placement is evaluated by comparing simulation results when VM placement is limited to select hosts due to software-induced heterogeneity limitations (e.g., affinity and anti-affinity rules, and licensing constraints) to simulation results when all VMs can be placed on all hosts. If the results show that an increased percentage of VMs can be powered on or that the performance of VMs already powered on increases, then the remediation option to reduce software-induced heterogeneity will be selected as a possible option. In a further embodiment, the specific constraints most constraining performance will be included with the remediation option.

At block 508, the impact of other placement constraints (e.g., infrastructure-based affinity rules, host incompatibilities, etc.) is evaluated by comparing simulation data generated when VMs are only placed on select hosts according to the other placement constraints to simulation data that ignores the other placement constraints. If the comparison shows that an increased percentage of VMs can be powered on or that the performance of VMs already powered on increases, then the remediation option to revisit the necessity of the other placement constraints will be selected as a possible remediation option. In further embodiments, the specific constraints most constraining performance will be included with the remediation option.

At block 510, the impact of additional hardware resources (e.g., additional hosts or additional datastores) or reconfiguring hardware resources (e.g., redistribute VM across datastores) is evaluated by comparing simulation data generated when additional hardware resources are added or when hardware resources are reconfigured to when additional hardware resources are not added or reconfigured. If the comparison shows that an increased percentage of VMs can be powered on or that the performance of VMs already powered on increase, then the remediation option to add or reconfigure additional hardware resources will be selected as a possible remediation option. In an embodiment, multiple configurations (i.e., combinations of additional resources and reconfiguration of resources) can yield improvements and, if adding or reconfiguring hardware resources is selected, as discussed below, the various configurations can be presented to a user to determine which configuration to implement.

At block 512, each possible remediation option is assigned a cost. The assignment of a cost is discussed further below with reference to FIG. 6. At block 514, the list of remediation options are presented to the user.

If a presented remediation option is implemented or another change is made to an element in the virtual machine network, an offer to run additional simulations to determine the effect of the modification can be made and, in an embodiment, additional recommendations are made based on the results of additional simulations.

In an embodiment, the recommendations discussed above will be delivered to a user via a graphical user interface. For example, if an attempt to power on a new VM fails the resource check, then an error message is displayed on a display device recommending various remediation options.

Figure 6:
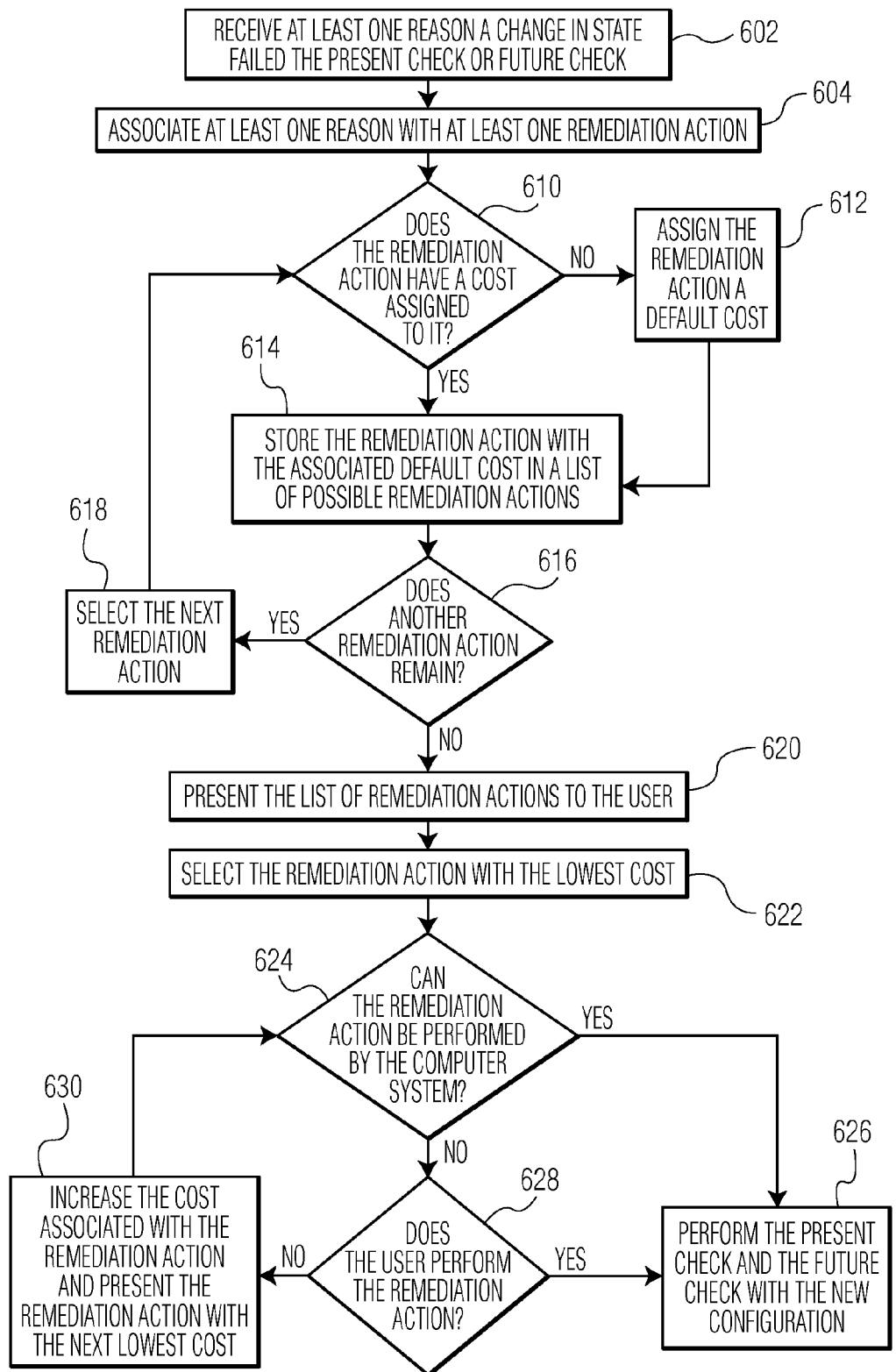
FIG. 6 is a process flow diagram for assigning costs to remediation options and providing remediation recommendations in accordance with an embodiment of the invention.

As discussed above with reference to blocks 510 and 512 of FIG. 5, remediation options are assigned a cost and then selected for presentation to a user. FIG. 6 is a process flow diagram of a process for assigning costs to remediation options and providing remediation recommendations to a user. At block 602, at least one reason why a change in state failed the present check or the future check is received and, at block 604, at least one reason received is associated with at least one remediation action that would allow the change in state to pass the present check or the future check. The remediation action can be, for example, "mount the VM's datastores on the host" if the received reason is a "host is not compatible", "remove affinity rule 23" if the received reason is "affinity rule 23 is limiting resource entitlements," or any of the remediation actions discussed above with reference to FIG. 5.

After associating at least one reason with at least one remediation action (block 604), at decision point 610, a determination is made whether the remediation action already has a cost assigned to it by looking for the remediation action in a list of possible remediation actions with which a cost has already been assigned. At block 612, if the remediation action has not already been assigned a cost (i.e., not already in the list of possible remediation actions), then the remediation action is assigned a default cost. In an embodiment, the default cost can be previously defined by a user. In another embodiment, the default cost can be previously defined automatically by the action-cost module. Once the default cost has been assigned or if a cost is already assigned, then, at block 614, the remediation action and assigned cost are stored as an action-cost pair in the list of possible remediation actions. At decision point 616, a determination is made whether the reason received at block 602 was associated with another remediation action at block 604 that has not been evaluated and, at block 618, the unevaluated remediation action is selected and the process returns to block 606. Alternatively, at block 620, the list of remediation actions is presented to the user. The user then selects at least one recommended remediation action to be evaluated. At block 622, a determination is made whether the remediation action with the lowest assigned cost in the set of user-selected remediation actions can be performed by the computer system and, at block 626, the remediation action is implemented and the process repeats the present and future checks. In an embodiment, when a remediation action is implemented, the predefined default cost associated with the implemented remediation action can be decreased for future use by the action-cost module. If the remediation action cannot be performed by the computer system, then, at decision point 628, the system monitors whether the user implements the presented remediation action and, if the user implements the presented remediation action, then, at block 626, the present check and future check are performed using the new configuration (i.e., the configuration of the host computers that run virtual machines). If the user does not implement the remediation action, then, at block 630, the cost associated with the presented remediation action is increased, the remediation action with the next lowest cost is selected, and the process returns to decision point 624. In an embodiment, if all of the selected remediation actions cannot be implemented by the computer system or the user, then the process can return to block 620 and allow the user to selected more or different remediation actions to implement. In a further embodiment, more than one remediation action is implemented before the present check and future check are performed again.

Action-Cost Module

In an embodiment, steps 510 and 512 of FIG. 5 and the steps in FIG. 6 can be performed by an action-cost module. The action-cost module is used in the access control process described with reference to FIGS. 3-5 to assign costs to actions selected as possible remediation options and to present a set of remediation options with the lowest assigned cost. To assign costs and present a set of remediation options, the access control process sends the action-cost module the reasons why a change in state failed the present check or the future check. In an embodiment, the action-cost module associates possible remediation actions with the reasons for the failure, rates the actions, presents the best rated actions to the user, and updates the rating of the implemented action(s) based on the user's response to the options in accordance with the steps discussed above with reference to FIG. 6.

Access Control System

Figure 7:
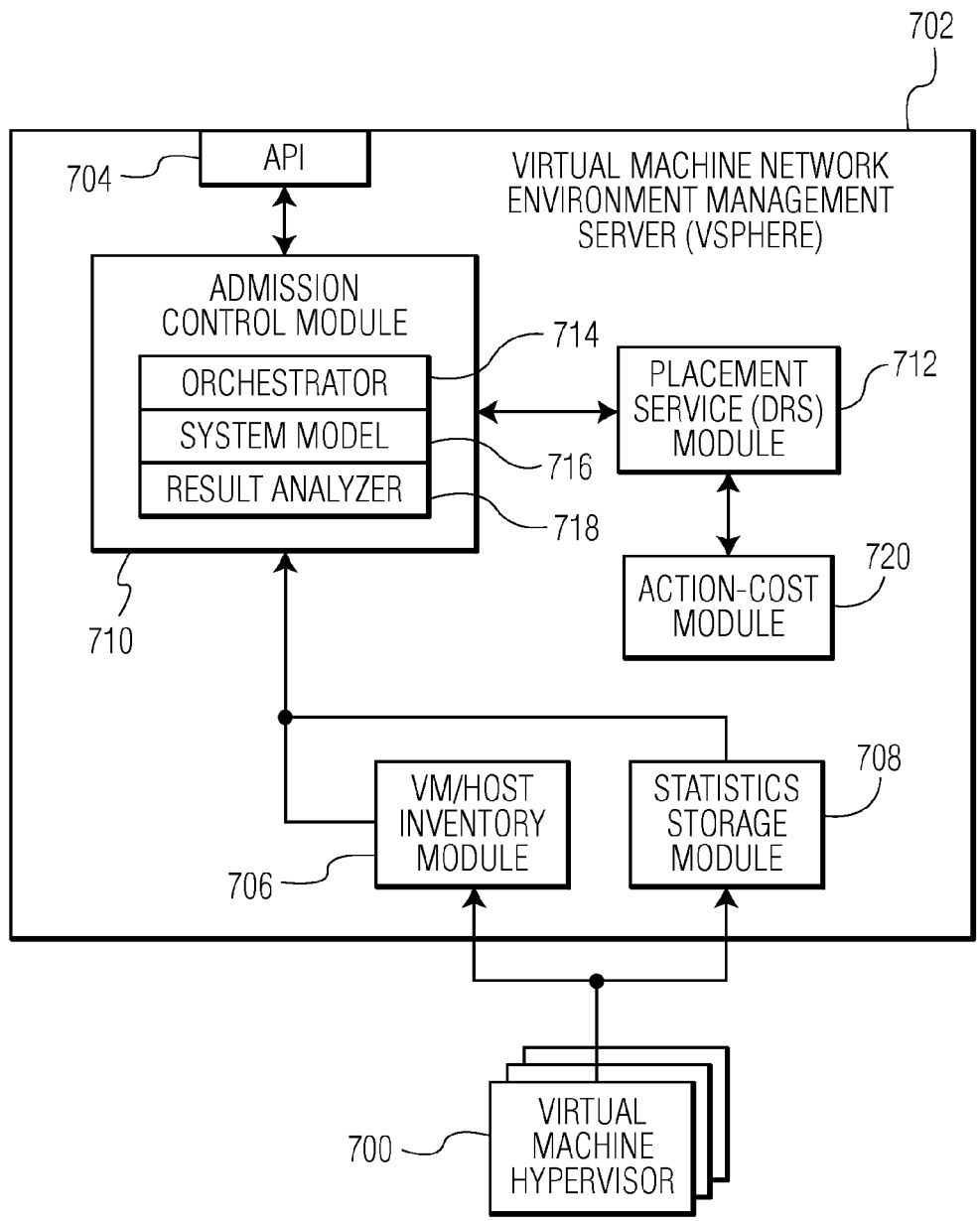
FIG. 7 is block diagram of a host computer in which an admission control process can be performed in accordance with an embodiment of the invention.

The access control process described with reference to FIGS. 3-5 can be implemented by a virtual machine network environment manager such as a vCenter™ Server or other similar virtual machine network environment manager. Alternatively, the access control process can be implemented as a web service. In an embodiment, the access control process is implemented by the system of FIG. 7, which depicts an embodiment of a system for managing user-initiated state changes within a cluster of host computers running virtual machines. In the embodiment of FIG. 7, the system includes a virtual machine hypervisor 700 and a virtual machine network environment management server (management server) 702. The management server includes an API 704, a VM/Host inventory module 706, a statistics storage module 708, an admission control module 710, a placement service module 712, and an action-cost module 720. The admission control module further includes an orchestrator 714, a system model 716, and a result analyzer 718. The orchestrator facilitates the admission control process by running simulations over the data in the system model when a change in state is identified. The results of the simulations are then analyzed by the results analyzer. In an embodiment, the output can then be used by the placement service module to determine if a VM can be powered on or if a host can be placed into maintenance mode and, if a VM cannot be powered on or if a host cannot be placed into maintenance mode, the placement service module can use the action-cost module to present a remediation option to the user. In an embodiment, the admission control module presents remediation options to a user by raising an alert and asking the user for input.

Figure 8:
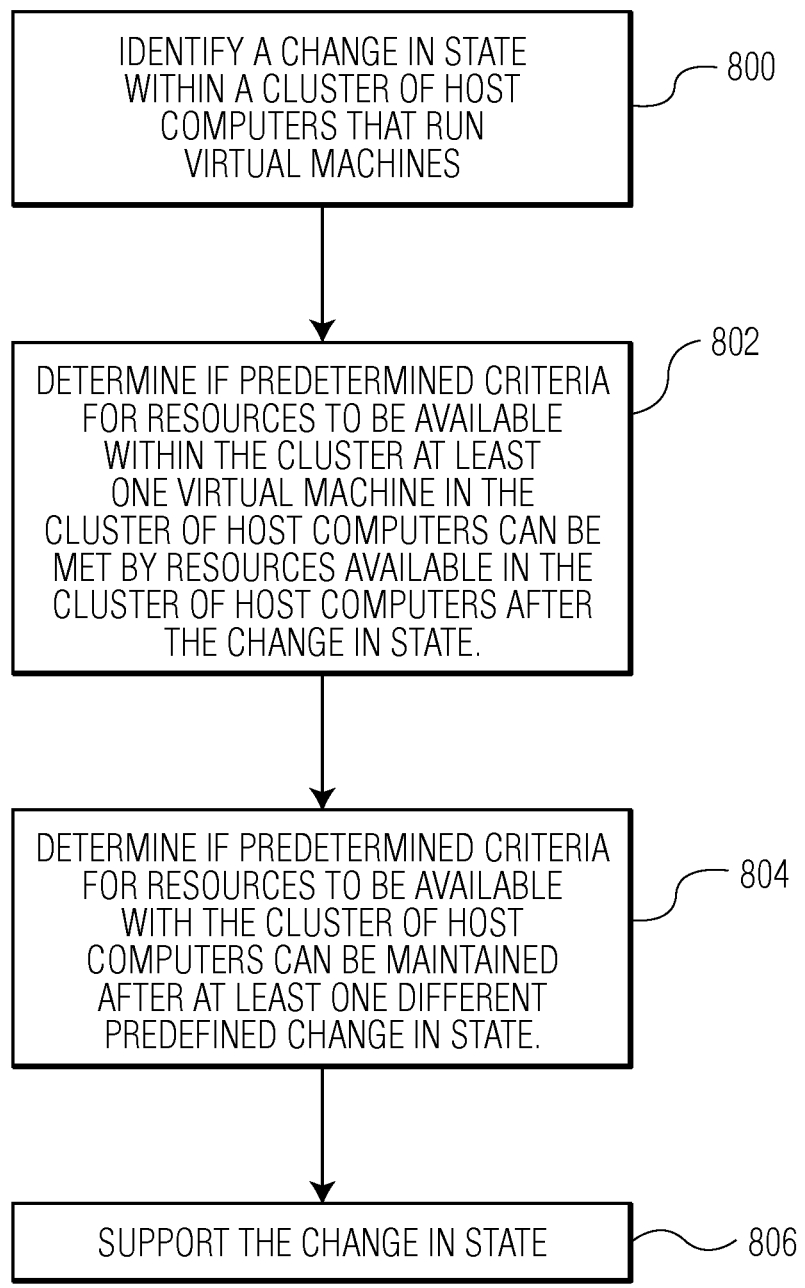
FIG. 8 is a process flow diagram of a method for supporting a change in state within a cluster of host computer that is running virtual machines.

FIG. 8 is a process flow diagram of a method for supporting an identified change in state within a cluster of host computers that are running virtual machines. At block 800, a change in state within a cluster of host computers that run virtual machines is identified. At block 802, whether predetermined criteria for resources to be available within the cluster for at least one virtual machine can be met by resources available in the cluster of host computers after the change in state is determined. At block 804, whether predetermined criteria for resources to be available within the cluster for at least one virtual machine can be maintained by resources available in the cluster of host computers after the change in state is determined. At block 806, if existing resource allocation expectation criteria can be satisfied and predefined resource allocation expectation criteria can be met under future demand after the change in state, then the identified change in state is supported. In an embodiment, if the change in state is user-initiated, then supporting the change in state involves allowing the change in state and, if the change in state is not user-initiated, then supporting the change in state involves not terminating functionality of VMs in the cluster. In an embodiment, the method of FIG. 8 is implemented by the system of FIG. 7.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer usable storage medium for execution by a computer. As an example, an embodiment of a computer program product includes a computer usable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-usable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for adjusting the configuration of host computers in a cluster on which virtual machines are running in response to a change in state, the method comprising:
   receiving at least one reason a change in state failed a present check or a future check, wherein the present check determines if historical demand of at least one virtual machine in a cluster of host computers can be met by resources available in the cluster of host computers after the change in state is applied to the cluster;
   associating the at least one reason with at least one remediation action, wherein the remediation action would allow the change in state to pass both the present check and the future check;
   assigning the at least one remediation action a cost; and
   determining a set of remediation actions to perform based on the cost assigned to each remediation action.

2. The method of claim 1, wherein determining a set of remediation actions involves:
   determining if a reason a change in state failed the present check or the future check can be resolved by a remediation action that can be performed by the computer system;
   if a reason a change in state failed the present check or the future check can be resolved by a remediation action that can be performed by the computer system, performing the remediation action by the system; and
   if a reason a change in state failed the present check or the future check cannot be resolved by a remediation action that can be performed by the computer system, selecting the remediation action with the lowest assigned cost from the at least one remediation actions and presenting the remediation action to a user.

3. The method of claim 1, wherein the cost assigned to a remediation action is previously defined by a user.

4. The method of claim 1, wherein assigning the remediation action a cost is performed by the action-cost module.

5. The method of claim 4, wherein the action-cost module assigns a cost to a remediation action by:
   determining if the remediation action has a cost previously assigned to it; and
   if the remediation action does not have a cost previously assigned to it, assigning the remediation action a default cost and, if the remediation action has the lowest assigned cost, presenting the remediation action to a user; and
   if the remediation action does have a cost previously assigned to it and the cost is the lowest assigned cost, presenting the remediation action to the user; and
   if the remediation action is accepted by the user, assigning the remediation action a lower cost and if the remediation action is refused, assigning the remediation action a higher cost.

6. The method of claim 1, wherein a future check determines if predefined criteria for resources to be available within a cluster of host computers can be maintained after at least one different predefined change in state is applied to the cluster.

7. A non-transitory computer-readable storage medium comprising instructions that, when executed in a computing device, causes the computing device to carry out the steps of:
   receiving at least one reason a change in state failed a present check or a future check, wherein the present check determines if historical demand of at least one virtual machine in a cluster of host computers can be met by resources available in the cluster of host computers after the change in state is applied to the cluster;
   associating the at least one reason with at least one remediation action, wherein the remediation action would allow the change in state to pass both the present check and the future check;
   assigning the at least one remediation action a cost; and
   determining a set of remediation actions to perform based on the cost assigned to each remediation action.

8. The non-transitory computer-readable storage medium of claim 7, wherein determining a set of remediation actions involves:
   determining if a reason a change in state failed the present check or the future check can be resolved by a remediation action that can be performed by the computer system;
   if a reason a change in state failed the present check or the future check can be resolved by a remediation action that can be performed by the computer system, performing the remediation action by the system; and
   if a reason a change in state failed the present check or the future check cannot be resolved by a remediation action that can be performed by the computer system, selecting the remediation action with the lowest assigned cost from the at least one remediation actions and presenting the remediation action to a user.

9. The non-transitory computer-readable storage medium of claim 7, wherein the cost assigned to a remediation action is previously defined by a user.

10. The non-transitory computer-readable storage medium of claim 7, wherein assigning the remediation action a cost is performed by the action-cost module.

11. The non-transitory computer-readable storage medium of claim 10, wherein the action-cost module assigns a cost to a remediation action by:
   determining if the remediation action has a cost previously assigned to it; and if the remediation action does not have a cost previously assigned to it, assigning the remediation action a default cost and, if the remediation action has the lowest assigned cost, presenting the remediation action to a user; and if the remediation action does have a cost previously assigned to it and the cost is the lowest assigned cost, presenting the remediation action to the user; and if the remediation action is accepted by the user, assigning the remediation action a lower cost and if the remediation action is refused, assigning the remediation action a higher cost.

12. The non-transitory computer-readable storage medium of claim 7, wherein a future check determines if predefined criteria for resources to be available within a cluster of host computers can be maintained after at least one different predefined change in state is applied to the cluster.

13. A computer system comprising:
at least one host computing device, the host computing device including a processor and memory for running instantiated virtual machines; and
a virtual machine management system including an action-cost module for adjusting the configuration of host computing devices in response to a failed present check or future check, the action-cost module being configured to:
  receive at least one reason a change in state failed a present check or a future check, wherein the present check determines if historical demand of at least one virtual machine in a cluster of host computers can be met by resources available in the cluster of host computers after the change in state is applied to the cluster;
  associate the at least one reason with at least one remediation action, wherein the remediation action would allow the change in state to pass both the present check and the future check;
  assign the at least one remediation action a cost; and
  determine a set of remediation actions to perform based on the cost assigned to each remediation action.

14. The computer system of claim 13, wherein the determination of a set of remediation actions involves:

if a reason a change in state failed the present check or the future check can be resolved by a remediation action that can be performed by the computer system, performing the remediation action by the computer system; and if a reason a change in state failed the present check or the future check cannot be resolved by a remediation action that can be performed by the computer system, selecting the remediation action with the lowest assigned cost from the at least one remediation action and presenting the remediation action to a user.

15. The computer system of claim 13, wherein the cost assigned to a remediation action is previously defined by a user.

16. The computer system of claim 13, wherein the cost assigned to a remediation action is determined by the action-cost module.

17. The computer system of claim 16, wherein the action-cost module determines the cost assigned to a remediation action by:
determining if the remediation action has a cost previously assigned to it; and if the remediation action does not have a cost previously assigned to it, assigning the remediation action a default cost and, if the remediation action has the lowest assigned cost, presenting the remediation action to a user; and if the remediation action does have a cost previously assigned to it and the cost is the lowest assigned cost, presenting the remediation action to the user; and if the remediation action is accepted by the user, assigning the remediation action a lower cost and if the remediation action is refused, assigning the remediation action a higher cost.

18. The computer system of claim 13, wherein a future check determines if predefined criteria for resources to be available within a cluster of host computers can be maintained after at least one different predefined change in state is applied to the cluster.

* * * * *